July 29, 1924. 1,502,927
H. S. SWEET
FLUID PRESSURE BRAKE
Filed Nov. 10, 1921
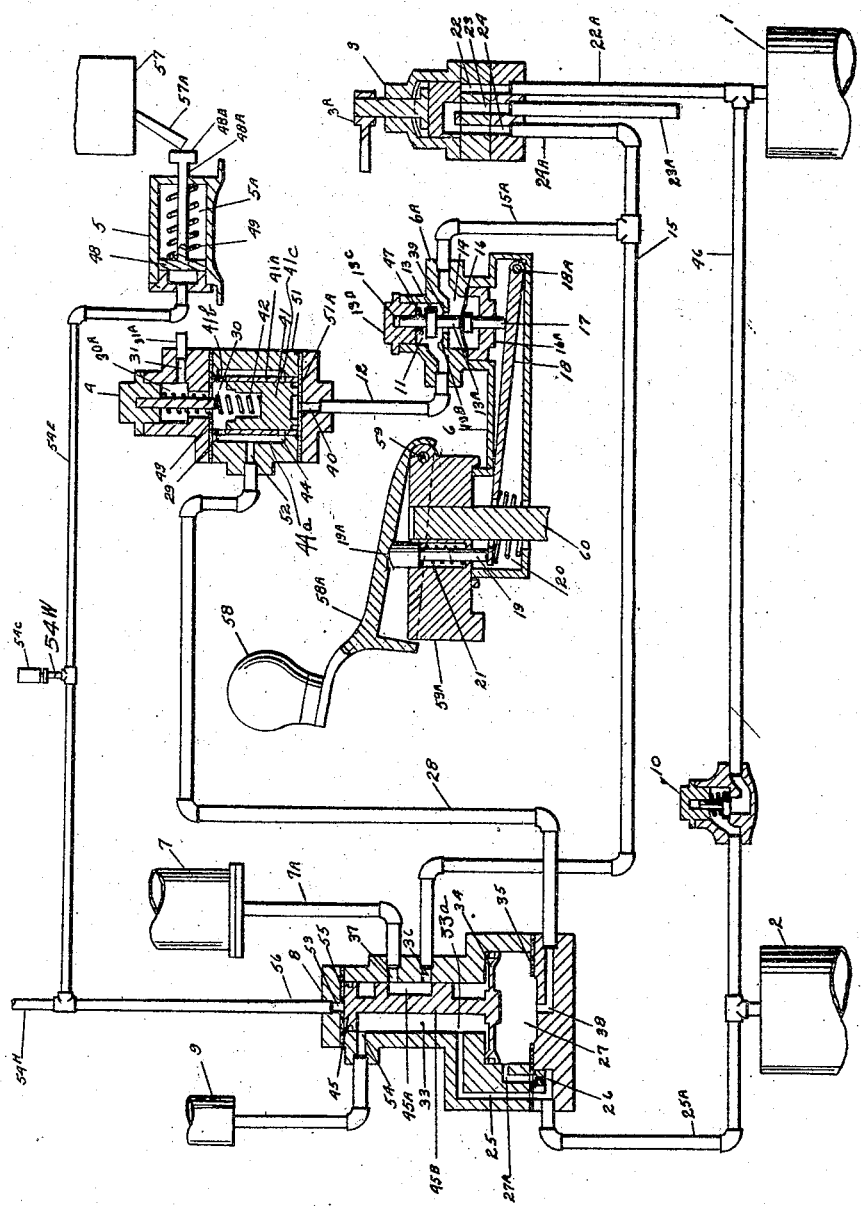
INVENTOR
Harrison S. Sweet
BY Thomas L. Wilde
ATTORNEY Patented July 29, 1924.

1,502,927

UNITED STATES PATENT OFFICE.

HARRISON S. SWEET, OF UTICA, NEW YORK.

FLUID-PRESSURE BRAKE.

Application filed November 10, 1921. Serial No. 514,193.

*To all whom it may concern:*

Be it known that I, HARRISON S. SWEET, a citizen of the United States, residing at Utica, in the county of Oneida and State of New York, have invented certain new and useful Improvements in Fluid-Pressure Brakes, of which the following is a specification, reference being had therein to the accompanying drawings.

My invention relates to a fluid pressure brake and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide an auxiliary air pressure system that will act independently of the main system of an electric car or other vehicle to which it is applied, whereby to automatically set the brakes, under conditions hereinafter stated, immediately the operator withdraws his hand or removes pressure from the controlling pilot valve handle, that is employed in said system.

Furthermore, the invention is designed to set the brakes immediately the pressure in the system falls below a given degree. Thus should the motorman attempt to start the car, the pressure being below the predetermined pressure, he would be unable to do so, or should the car be in motion and the pressure fall the brakes will set automatically. This feature will insure at all times a sufficient air pressure in the system for the proper application of the brakes.

The invention is designed also to knock off the electric circuit switch of the car simultaneously with the application of the brakes, and to sound an alarm.

The object will be understood by referring to the drawings, in which:

The figure is a diagrammatic view of the system, showing parts in central vertical section and other parts in full.

Referring more particularly to the drawings, the invention embodies a motorman's brake valve 3, the upper end of which is squared to adapt the same for the reception of a socket handle $3^a$ here shown. Valve 3 controls the passageways from ports 22, 23 and 24. Port 22 opens from conduit $22^a$ that leads to main pressure reservoir 1. Port 23 connects with the outside atmosphere through conduit $23^a$ and port 24 opens into pipe $24^a$ that eventually connects through pipe 15 to chamber 33 formed by valve casing 8.

A movable valve stem $45^b$ is disposed in chamber 33 and has attached to its lower end a piston valve 34 adapted to seat against leather gasket 35 disposed between parts of casing 8.

Valve stem $45^b$ has formed therein a cavity valve $45^a$ adapted to connect the port 36 with port 37, when said stem is in its uppermost position, as shown in the drawings. In this position of stem $45^b$, pipe 15 will connect indirectly with pipe $7^a$, through cavity valve $45^a$, which pipe $7^a$ leads to the brake cylinder 7 adapted to apply the brakes of the car. Therefore, if the brake valve 3 is turned to allow the compressed air in reservoir 1 to flow through pipes $22^a$, $24^a$ and $7^a$, there will be a direct application of the brakes.

The system also contemplates the automatic setting of the brakes and embodies for this purpose, a pilot valve handle 58 fulcrumed at 59 to a suitable bearing block $59^a$ that is supported by a post 60. Bearing block $59^a$ has a recess for the disposition of a spring pressed plunger 19 actuated by spring 21. The upper end of plunger 19 rests in a recess $19^a$ formed in the under side of lever $58^a$. The lower end of the plunger 19 rests upon the upper side of lever 18 that is fulcrumed at $18^a$ to a casing 6. One end of lever 18 is held normally in upward position, whereby it will elevate plunger 19 and hence, handle 58, by a coiled spring 20.

The neck $6^a$ of said casing 6 supports therewithin a diaphragm 16 adapted to seal chamber 14 from leakage. Diaphragm 16 is held in place by a collar $16^a$.

A stem 17 projects through a recess in collar $16^a$ and bears at its upper end against the lower surface of diaphragm 16. The lower end of stem 17 rests upon the upper surface of lever 18. Above diaphragm 16 and directly over stem 17 is located the lower end of valve stem $13^a$ that is connected to valve 13. Valve 13 is adapted to seat at $13^b$, whereby to close port 39. The upper end of valve stem $13^a$ is housed in a recess $13^c$ formed in cap 13$^d$ and is surrounded by a coiled spring 47 adapted to force valve 13 normally downward upon its seat 13$^b$.

Port 39 connects chamber 14 below and chamber 11 above valve 13, which chambers are formed in casing 6. Chamber 11 is united by pipe 12 at 40 to a chamber 30 formed in the switching valve casing 51. Chamber 30 is divided by a hollow cylindrical wall 41$^a$, which has ports 41$^b$, 41$^c$, 44 and 29 made therein.

A vertically movable valve 41 is disposed within the wall 41$^a$. The valve 41 may be seated under tension of spring 42 against leather gasket 51$^a$, as shown in the drawings, whereby to close port 40 and open port 29, or it may be moved up against the pressure of spring 42 to seat at 43, whereby to open ports 40 and close port 29.

Chamber 30 is connected to chamber 30$^a$ by a narrow passageway which has a port 31 that opens into pipe 31$^a$ to atmosphere. Chamber 30 is connected also to chamber 27 formed in emergency valve casing 8 by pipe 28 and port 38. Moreover, chamber 27 within casing 8 has an inlet port at 27$^a$. The mouth of the channel leading to port 27$^a$ is screw threaded for mounting the mouth piece 26 having a very small aperture. Mouth piece 26 is made demountable, whereby other pieces may be substituted to govern the size of the aperture.

The aperture of piece 26 opens into passageway 25 that is connected with pipe 25$^a$ which is jointed to emergency reservoir 2. Emergency reservoir 2 is connected to main reservoir 1 by pipe 46, which has a one way valve 10 disposed therein, whereby to permit the air to pass from main reservoir 1 to emergency reservoir 2 but not in the opposite direction.

Emergency reservoir 2 is used in the system and is disposed generally near the rear or middle of the inside of the car whereby to remain intact and preserve the pressure system, in the event that the car has a collision that damages the main reservoir 1.

Passageway 25 of casing 8 also opens into chamber 33, whereby compressed air may enter to aid in forcing valve stem 45$^b$ upward to seat valve 45 against leather gasket 55 held in place by parts of casing 8.

Valve 45 is adapted to open port 54 in order that compressed air may enter and recharge the tank 9. The compressed air from tank 9 is used to force sand onto the tracks. When valve 45 moves downward below the location of port 54, it will open up a passageway to port 53 and tube 56 which controls the sand.

Moreover, pipe 56 is connected by a pipe 54$^w$ to a whistle 54$^c$ and to pipe 54$^e$ that opens into chamber 5$^a$ formed by casing 5. A piston 48 is disposed in chamber 5$^a$ and is held normally against its seat, as shown in the drawings, by a coiled spring 49. A piston rod 48$^a$ projects through an aperture in casing 5$^a$ and has attached a head 48$^b$ adapted to make contact with switching handle 57$^a$ of the electric circuit breaker 57.

In order to operate the system, assuming that there is no air pressure therewithin and that pilot valve handle 58 is in upper position, as shown in the drawings, whereby valve 13 is unseated, the compressor on the car, not here shown, is started to build up compressed air in main reservoir 1 and through pipe 46, one way valve 10 to emergency reservoir 2, therepast to passageway 25. A part of the compressed air in passageway 25 will escape up through the small aperture in piece 26 to conduits 27$^a$ to chamber 27, to conduit 38 to pipe 28 to port 52 to chamber 30 in switching valve casing 4 to chamber 30$^a$ to atmosphere through pipe 31$^a$. However, this exhaust to atmosphere is not sufficiently great to keep the pressure in main reservoir system from building up.

Immediately, however, the pressure in the main reservoir system has become sufficiently great, the compressed air that has entered chamber 33 by way of port 33$^a$, will move piston 34 downward upon its seat 35, thereby closing port 38 to prevent further leakage to atmosphere through aforesaid circuit.

The movement of piston 34 and piston stem 45$^b$ downward will close or pocket port 36 and open port 37 to chamber 33, thereby permitting the compressed air to flow from chamber 33 through port 37 to brake cylinder 7 to apply the brakes.

The brakes can be released, thereafter, by turning brake valve 3 to application position, whereby compressed air will be allowed to pass from main reservoir 1 to pipe 22$^a$ to pipe 24$^a$ to pipe 15 to pipe 15$^a$ to chamber 14, in pilot valve casing 6, through port 39 to chamber 11 to pipe 12 to port 40. Immediately this latter pressure at port 40 has become sufficiently great it will force piston 41 upward against the action of spring 42 and piston 41 will come to rest against its upper seat 43, thereby closing port 29 and chamber 30 and 30$^a$ to atmosphere and opening chamber 30 to port 44, whereby to permit the compressed air to flow therethrough and through chamber 44$^a$ to port 52 to pipe 28 to chamber 27, where the pressure will force piston 34 and piston stem 45$^a$ upward to again connect ports 36 and 37.

If pilot valve handle 58 is moved now downward, whereby to close valve 13 in pilot valve casing 6 and the brake valve 3 turned to connect pipe 24$^a$ to 23$^a$ to atmosphere, the compressed air in cylinder 7 will be allowed to exhaust by way of pipes 7$^a$, port 37, chamber 45$^a$ port 36, pipe 15, pipe 24$^a$, and pipe 23$^a$ to atmosphere. This position of the valves is the normal running position of the system.

In order to make a service application of the brakes, not shown, the brake valve 3 is moved to connect port 22 with port 24 and to close port 23, thereby allowing the compressed air to flow from main reservoir 1 to port 22 to port 24 through pipe 24ᵃ to port 36 to port 37 to pipe 7ᵃ to brake cylinder 7, which will set the brakes.

The brakes may be released, thereafter, by turning the brake valve 3 to connect ports 24 and 23 and to close port 22, whereby the compressed air will be allowed to exhaust to atmosphere back over the same course.

In the normal position of the valves, as explained above, that is when handle 58 is down and brake valve 3 is turned to connect ports 24 and 23 to atmosphere, if under such circumstances, the handle 58 should be released and allowed to rise, the air pressure under valve 41 would be insufficient to keep the same up against its seat 43 and, thereby, the spring 42 would force said valve 41 downward upon gasket 51ᴬ. This position of valve 41 would open port 29 to chamber 30 in switching valve casing 4, and allow the compressed air to pass to chamber 30ᵃ to port 31 to pipe 31ᵃ to atmosphere. This open passageway will allow, also, the compressed air in chamber 27 under piston 34 to exhaust, whereby piston 34 will be forced by the compressed air in chamber 33 upon its seat 35 and, thereby, connect chamber 33 to port 37 to allow the compressed air from emergency reservoir 2 to flow therethrough to brake cylinder 7, thus applying the brakes.

When piston 34 is forced down against its seat 35, piston 45 will move likewise from its seat 55 and open ports 53 and 54 into that part of chamber 33 that is located above said piston 45, whereby to permit the air pressure in tank 9 to flow through port 54 to port 53 to pipe 56 to pipe 54ᴴ to sander, not here shown, to whistle 54ᶜ and also into chamber 5ᵃ of casing 5. Here the compressed air will actuate piston 48 against spring 49 to cause the piston rod 48ᵃ to rock the electric switch arm 57ᵃ off the electric circuit knockout 57 and, thereby shut off the electric motive power.

The brakes can be released again by turning brake valve 3 to connect ports 22 and 24, thereby allowing compressed air to flow through pilot valve 13 and switching valve chamber 30 to pipe 28 to chamber 27 of the emergency valve casing, whereby to force piston valve 34 upward.

If at any time the air pressure in chamber 30 of switching valve casing 4 is reduced below a predetermined pressure, independent of the position of pilot valve handle 58 or brake valve 3, spring 42 will force piston 41 downward from its seat 43 and, thereby, automatically apply the brakes, as above explained. The brakes, in this instance, cannot be released again until the pressure is exhausted from the system or until the pressure of air through port 40 has been increased to the predetermined degree that is sufficient to move piston 41 upward and off from its seat 51 and upon seat 43.

Whenever pilot valve handle 58 is released and there is air pressure sufficient in pipe 15 to counteract the pressure coming through pipes 28 and 12 and at the same time to hold piston 41 upward against its seat 43 and to prevent the escape of the compressed air from chamber 27 in emergency valve casing 8 faster than said air is fed therein through port 27ᵃ, thereby keeping the pressure constant in chamber 27, the valve piston 34 will be held in upward position and brake pressure will increase to reservoir pressure.

The capacity of air pressure of emergency tank 2 is to be such that when an emergency application of the brakes is effected, the compressed air in brake cylinder 7 and in emergency reservoir 2 will equalize at some pressure, whereby it will be possible for the compressed air from main reservoir 1 at proper pressure to overcome said combined pressures to move the emergency valve piston 34 upward to release position.

Having thus described my invention, what I claim as new and desire to secure by Letters Patent is:

1. In a fluid pressure brake containing an emergency valve, a brake cylinder, pipes for carrying fluid pressure whereby to operate the emergency valve, and means for switching the fluid pressure from the pipes which operate the emergency valve to other pipes carrying fluid pressure and others carrying atmosphere pressure.

2. In a fluid pressure brake containing an emergency valve, a brake cylinder, pipes for carrying fluid pressure, whereby to operate the brakes, other pipes connected to said emergency valve to control the actuation thereof, still other pipes carrying atmospheric pressure, and means for changing the pressure in said pipes that control the emergency valve by switching an exhaust from said emergency valve controlling pipes to said pipes carrying fluid pressure and to said other pipes carrying atmospheric pressure.

3. In a fluid pressure brake containing an emergency valve, a brake cylinder, pipes for carrying fluid pressure, whereby to operate the brakes, pipes connected to and controlling said emergency valve, other pipes carrying atmospheric pressure, still other pipes carrying straight air pressure and means for changing the fluid pressure in said pipes that control the emergency valve by switching an exhaust from these pipes to said pipes carrying straight air pressure and pipes carrying atmospheric pressure.

4. In a fluid pressure brake which contains an emergency valve, a brake cylinder, pipes connected with said cylinder, whereby to carry fluid pressure to operate the brakes, other pipes carrying atmospheric pressure, still other pipes carrying straight air pressure, still other pipes connected with the emergency valve, means for changing the fluid pressure in the pipes that connect with the emergency valve by switching an exhaust from these pipes to pipes carrying said straight air pressure and said pipes carrying atmospheric pressure, and means for actuating said switching valve, whereby to aid in actuating said brakes.

5. In a fluid pressure brake containing an emergency valve, a brake cylinder, pipes connected with said brake cylinder for carrying fluid pressure, whereby to operate the brakes, a switching valve connected to said pipes, means for controlling said switching valve, pipes connecting said switching valve with the emergency valve, and an air operated valve for automatically setting the brakes, when the fluid pressure falls below a given degree.

6. In a fluid pressure brake, an emergency valve, a switching valve, a brake cylinder, an electric circuit breaker knockout cylinder, pipes for carrying compressed air to said brake cylinder, whereby to operate the brakes, other pipes connecting said emergency valve with said switching valve, whereby to change the location of the exhaust from said emergency valve, and a pipe connecting said emergency valve with the electric circuit breaker cylinder, whereby said emergency valve will cause the compressed air to shut off the electric current when the brakes are set.

7. In a fluid pressure brake having an emergency valve, a fluid pressure reservoir, a brake cylinder, pipes connecting said reservoir with said emergency valve, other pipes connecting said emergency valve with the brake cylinder, a valve for causing a direct application of air pressure to said brake cylinder, whereby to set the brakes, a pilot valve for automatically setting said brakes, and said emergency valve adapted to operate said brakes, when the pressure in a part of the system falls below a predetermined level.

8. In a fluid pressure brake having an emergency valve, a fluid pressure reservoir, a brake cylinder, pipes connecting said reservoir with said emergency valve, other pipes connecting said emergency valve with said brake cylinder, a switching valve, pipes connecting said reservoir and emergency valve casing with said switching valve casing, a pilot valve for controlling said switching valve, whereby to automatically set the brakes, and said emergency valve adapted to set the brakes when the pressure falls below a predetermined degree.

9. In a fluid pressure brake having an emergency valve, a fluid pressure reservoir, an emergency pressure reservoir, a brake cylinder, pipes connecting said reservoirs with the brake cylinder, and said emergency valve having means adapted to cause the application of the brakes when the pressure in the system falls below a predetermined level.

10. In a fluid pressure brake having an emergency valve, with a chamber, a straight air pipe adapted to feed compressed air, a brake cylinder adapted to receive compressed air, means for switching the compressed air to said chamber in the emergency valve to the straight air pipe, other pipes carrying atmospheric pressure, whereby to exhaust the compressed air that actuates the emergency valve, and means for controlling the above switching mechanism.

11. In a fluid pressure brake containing an emergency valve having a chamber, a straight air pipe, a switching valve connected to said straight air pipe, whereby the pressure in said straight air pipe will actuate said switching valve, and automatic means for operating the brakes.

12. In a fluid pressure brake containing an emergency valve having a chamber, a straight air pipe, a switching valve adapted to allow the compressed air in said emergency valve chamber to escape to atmosphere, and a valve for operating said brakes when the pressure falls below a given degree.

13. In a fluid pressure brake containing an emergency valve having a chamber, pipes for conveying fluid pressure to said chamber, whereby to actuate said valve, a switching valve adapted to control the movements of said emergency valve and a valve for operating said brakes automatically when the pressure falls below a given degree.

14. In a fluid pressure brake, an emergency valve casing having a valve and valve chamber, a brake cylinder, pipes for conveying air pressure, whereby to operate the brakes, air pressure for actuating said emergency valve, whereby to release the brakes, and a valve for automatically setting the brakes, when the pressure falls below a given degree.

15. In a fluid pressure brake containing an emergency valve casing, a valve in said casing, a brake cylinder, pipes for conveying compressed air, whereby to operate the brakes, means for controlling the movement of said emergency valve, whereby to cause the setting and releasing of the brakes, a switching valve adapted to control the emergency valve, and a valve for automatically setting said brakes, when the pressure in the pipe falls below a given degree.

16. In a fluid pressure brake, a brake valve for controlling the brakes, a fluid pressure system, and automatic means for cutting off the propelling power of a car and actuating the brakes, when the pressure is removed from said brake valve.

17. In a fluid pressure brake, a brake valve handle for controlling the brakes, a fluid pressure system, and automatic means for controlling the propelling power of a car and actuating the brakes, when pressure is removed from said automatic means.

18. In a fluid pressure brake attached to a car, a brake valve, a controller, means for automatically applying the brakes and cutting off the power that runs the car, when manual pressure is removed from said means, said means being independent of the brake valve and controller which governs the power that runs the car.

19. In a fluid pressure brake system, a valve operated by fluid pressure for automatically applying the brakes when fluid pressure is at a predetermined pressure which is independent of pressure in any other part of the system.

20. In a fluid pressure brake system, a valve operated by fluid pressure for automatically applying brakes and cutting off power when fluid pressure is at a predetermined pressure which is independent of pressure in any other part of the system.

21. In a fluid pressure brake having a supply reservoir, a valve operated by fluid pressure for automatically applying brakes and cutting off power when fluid pressure in said supply reservoir is at a predetermined pressure and means for releasing the brakes.

22. In a fluid pressure brake having a reservoir, a valve operated by fluid pressure for automatically applying the brakes and cutting off power when fluid pressure in the reservoir is at a predetermined pressure, which is independent of the pressure in any other part of system, and means operated for releasing brakes only when reservoir system is at a predetermined pressure.

23. In a fluid pressure brake having a reservoir, a brake cylinder, a fluid pressure system, and means actuated by said fluid pressure for automatically warning the operator when pressure in said reservoir is at a predetermined pressure.

24. In a fluid pressure brake, a fluid pressure system, a brake cylinder, adapted to receive air pressure whereby to set the brakes, a whistle actuated by said fluid pressure for automatically warning the operator when the pressure in said system falls below a given degree and an emergency valve for controlling said fluid pressure.

In testimony whereof I have affixed my signature.

HARRISON S. SWEET.